(12) United States Patent
Kim et al.

(10) Patent No.: US 10,920,011 B2
(45) Date of Patent: *Feb. 16, 2021

(54) WATER SOLUBLE POLYMERS AND POLYMER ADDUCTS ALONG WITH AQUEOUS SOLUTIONS THEREOF

(71) Applicant: Arkema Inc., King of Prussia, PA (US)

(72) Inventors: Kyu-Jun Kim, Cary, NC (US); Rong Hu, Apex, NC (US); Jeremy L. Grove, Cary, NC (US)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/737,361

(22) PCT Filed: Jun. 21, 2016

(86) PCT No.: PCT/US2016/038478
§ 371 (c)(1),
(2) Date: Dec. 18, 2017

(87) PCT Pub. No.: WO2016/209796
PCT Pub. Date: Dec. 29, 2016

(65) Prior Publication Data
US 2018/0179329 A1 Jun. 28, 2018

Related U.S. Application Data

(60) Provisional application No. 62/183,304, filed on Jun. 23, 2015.

(51) Int. Cl.
*C08G 59/50* (2006.01)
*C08G 59/22* (2006.01)
(Continued)

(52) U.S. Cl.
CPC ....... *C08G 59/5006* (2013.01); *C08G 59/223* (2013.01); *C08G 59/226* (2013.01);
(Continued)

(58) Field of Classification Search
CPC .................. C08G 59/5006; C08G 59/223; C08G 59/226; C08G 65/2624; C08G 73/024;
(Continued)

(56) References Cited

U.S. PATENT DOCUMENTS 4,199,400 A 4/1980 Bakule et al.
4,525,571 A 6/1985 Burba et al.
(Continued)

FOREIGN PATENT DOCUMENTS

CN 101624385 1/2010
CN 103497311 1/2014
(Continued)

OTHER PUBLICATIONS

Generation of a Focused Poly(amino ether) Libary: Polymer-Mediated Transgene Delivery and Gold-Nanorod Bsed Theranostic Systems.
(Continued)

*Primary Examiner* — David T Karst
(74) *Attorney, Agent, or Firm* — Lynn B. Morreale

(57) ABSTRACT

A water soluble polymer or polymeric adduct has a backbone comprising a plurality of segments with amine functional groups and hydroxyl functional groups with a number average molecular weight of about 5.00 to 1,000,000 Daltons. The polymeric adduct may be formed as an addition product by reacting at least one multifunctional amine compound reacted with a one or more polyfunctional epoxy compounds and/or one or more monofunctional epoxy compounds, such that there are 1.3 to 3.8 reactive amine functional groups per reactive epoxy functional group. An aque-
(Continued)

(F-1A)

ous solution of the polymer or polymeric adduct has a viscosity of about 100 centipoise to 100,000 centipoise and a pH value of about 8 to 12 when the solution comprises 70 wt. % of the polymer or polymeric adduct dissolved in water. The polymeric adducts are useful fast setting additives for emulsions due to excellent stability when blended with anionically stabilized latex.

6 Claims, 2 Drawing Sheets

(51) Int. Cl.
| | |
|---|---|
| *C08G 65/26* | (2006.01) |
| *C08L 33/04* | (2006.01) |
| *C08G 73/02* | (2006.01) |
| *C08L 79/02* | (2006.01) |
| *C08L 63/00* | (2006.01) |
| *C08L 25/14* | (2006.01) |
| *C09J 179/02* | (2006.01) |
| *C09D 179/02* | (2006.01) |

(52) U.S. Cl.
CPC ....... *C08G 65/2624* (2013.01); *C08G 73/024* (2013.01); *C08L 33/04* (2013.01); *C08L 63/00* (2013.01); *C08L 79/02* (2013.01); *C08L 25/14* (2013.01); *C08L 2201/54* (2013.01); *C09D 179/02* (2013.01); *C09J 179/02* (2013.01)

(58) Field of Classification Search
CPC .......... C08L 25/14; C08L 33/04; C08L 63/00; C08L 79/02; C08L 2201/54; C09J 179/02; C09D 179/02

USPC ....................................................... 523/420
See application file for complete search history.

(56) References Cited

U.S. PATENT DOCUMENTS

| | | |
|---|---|---|
| 5,246,984 A | 9/1993 | Darwen et al. |
| 5,310,770 A | 5/1994 | DeGooyer et al. |
| 5,527,853 A | 6/1996 | Landy et al. |
| 5,672,379 A | 9/1997 | Schall et al. |
| 5,804,627 A | 9/1998 | Landy et al. |
| 6,075,079 A | 6/2000 | Helmer et al. |
| 6,653,369 B2 | 11/2003 | Gerlitz et al. |
| 6,734,226 B2 | 5/2004 | Hermes |
| 2007/0179258 A1* | 8/2007 | Ogawa ................. C08G 59/184 525/523 |
| 2010/0087568 A1* | 4/2010 | Krotzek ............... C08G 59/184 523/402 |
| 2012/0270967 A1* | 10/2012 | Burckhardt ........ C08G 59/4042 523/400 |
| 2015/0111994 A1* | 4/2015 | Sakane ................ C08G 59/184 523/468 |

FOREIGN PATENT DOCUMENTS

| | | |
|---|---|---|
| EP | 0 758 660 A2 | 2/1997 |
| WO | WO 02/22709 A1 | 3/2002 |
| WO | WO 2014/060456 A2 | 4/2014 |

OTHER PUBLICATIONS

Lucas Vu, et al—Ivysring International Publishing 2012; 2(12) 1160-1173 doi: 10.7150/thno.4492.

* cited by examiner

WATER SOLUBLE POLYMERS AND POLYMER ADDUCTS ALONG WITH AQUEOUS SOLUTIONS THEREOF

CROSS-REFERENCE TO RELATED APPLICATIONS

This application is a national stage application under 35 U.S.C. § 371 of PCT/US2016/038478 filed Jun. 21, 2016, which claims benefit to U.S. patent application Ser. No. 62/183,304, filed Jun. 23, 2015.

FIELD OF THE INVENTION

This invention relates generally to water soluble, quick-setting additives for use in coatings, inks, adhesives, sealants, and the like. More specifically, this disclosure relates to polymers and polymeric adducts, as well as aqueous solutions made using these polymers and polymeric adducts.

BACKGROUND OF THE INVENTION

The statements in this section merely provide background information related to the present invention and may not constitute prior art.

Latex products are widely used in a variety of coatings, adhesives, and inks because they offer several benefits, including the ease in which they can be handled and the absence of any substantial amount of volatile organic compounds (VOCs). Due to the market demand for products that exhibit a shortened setting time, the coating industry has widely adopted coagulation technology for use in latex products. Within the confines of such coagulation technology, protonated polyfunctional amines destabilize the anionically-stabilized latex particles present in the latex products after they are coated onto a substrate. However, in order to retain the stability of the modified latex particles in the latex product prior to application (e.g., during storage), a volatile amine is added to the latex product in order to increase the pH to a level that prevents the protonation of the polyfunctional amine. When the latex product is applied onto a substrate, the volatile amine escapes or evaporates from the applied coating composition. The loss of the volatile amine results in a decrease in the pH of the applied latex coating composition. The decrease in pH triggers the coagulation of the latex particles in the applied coating composition, which results in a fast setting time.

Numerous polyfunctional amine compounds have been utilized as quick-setting additives for latex products. U.S. Pat. No. 5,804,627 discloses a shelf-stable fast-cure aqueous coating that contains an anionically-stabilized latex, a polyfunctional amine, and a volatile base in an amount sufficient to deprotonate the conjugate acid of the amine.

Despite their distinct benefit of improving the setting time for the latex product when applied as a coating, the use of polyfunctional amine compounds is usually practical when the pH of the latex product is maintained at 10 or above. When the pH of the latex product is lower than 10, the polyamines tend to destabilize the anionically-stabilized latex particles and form unwanted solids in the latex product. In order to ensure that the pH remains higher than 10 during storage, volatile amines such as ammonia are typically added to the latex product. The need for a volatile amine limits the utilization of these latex products in a wide variety of applications due to the unpleasant odor of the volatile amine and the liberation of an excessive amount of the volatile amine into the environment during use of the latex product.

Polyfunctional amine compounds have also been used as epoxy curing agents. U.S. Pat. No. 6,653,369 describes water-dilutable amine-curing agents for aqueous epoxy resin dispersions, comprising a combination of an epoxide-amine adduct with an emulsifier. U.S. Pat. No. 5,246,984 describes a water compatible polyamine-epoxy adduct formed by the reaction of a polyamine with a mixture of a monoepoxide and polyepoxides.

SUMMARY OF THE INVENTION

The present disclosure generally provides polymers or polymeric adducts, as well as aqueous solutions formed therefrom. The polymers and polymeric adducts comprise, consist of, or consist essentially of the formula (F-1):

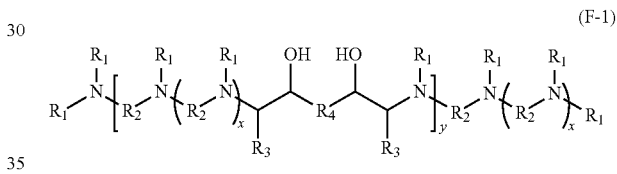

(F-1)

where $R_4$ is alkyl or

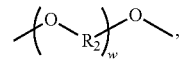

and $R_3$ is hydrogen or alkyl, and $R_2$ is alkyl, and $R_1$ is H, alkyl hydroxide, alkyl ether hydroxide, or

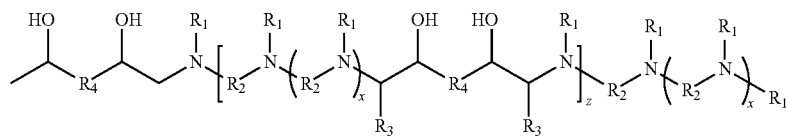

and w, x, y, and z are integers ranging between 1 and 20, between 0 and 10, between 1 and 10,000, and between 0 and 10,000, respectively. The polymers comprise 1.3 to 3.8 amine functional group per hydroxyl functional group. The polymeric adducts are water soluble and have a number average molecular weight in the range of about 500 to about 1,000,000 unified Daltons. In one preferred embodiment, the polymers and polymeric adducts represent compounds that are formed by the combination of amine and epoxy reactants via covalent bonds.

According to another aspect of the present disclosure, the polymeric adducts are formed as an addition product by reacting at least one multifunctional amine compound with one or more polyfunctional epoxy compounds, one or more monofunctional epoxy compounds, or a combination thereof. The addition product is formed by the reaction of an amine compound with one or more epoxy compounds, such that there are 1.3 to 3.8 reactive amine functional groups per reactive epoxy functional group. The addition product further comprises a nitrogen atom percentage of 5 to about 35, preferably from about 10 to about 20, even more preferred from about 15 to 25. The addition product is water soluble and has a number average molecular weight in the range of about 500 to about 1,000,000 unified Daltons, preferably from about 500 to about 500,000 Daltons, even more preferred from about 500 to about 200,000 unified Daltons.

The polyfunctional epoxy compounds comprise, consist of, or consist essentially of epoxides of unsaturated hydrocarbons and fatty acids/oils, epoxy ethers of multifunctional alcohols, or combinations thereof and the monofunctional epoxy compounds comprise, consist of, or consist essentially of epoxy ethers of monofunctional alcohols, the epoxide of monosaturated hydrocarbons, epoxy esters of monofunctional alcohols, or combinations thereof. The epoxides of unsaturated hydrocarbons and fatty acids/oils may be selected from the group of the epoxide of vinyl cyclohexene, dicyclopentadiene, cyclohexadiene, cyclododecadiene, cyclododecatriene, isoprene, 1,6-hexadiene, butadiene, polybutadiene, divinyl benzene, castor oil, soybean oil, and combinations thereof. The epoxy ethers of multifunctional alcohols may be selected from the group of trimethyol propane triglycidyl ether, pentaerythritol tetraglycidyl ether, trimethyol ethane triglycidyl ether, ethylene glycol diglycidyl ether, sorbitol glycidyl ethers, 2-methyl-1,3-propane diol diglycidyl ether, neopentyl glycol diglycidyl ether, 2,2,4-trimethyl pentanediol diglycidyl ether, propylene glycol diglycidyl ether, hydrogenated bisphenol A diglycidyl ether, 1,4-butanediol diglycidyl ether, 1,6-hexanediol diglycidyl ether, polyethylene glycol diglycidyl ether, polypropylene glycol diglycidyl ether, and combinations thereof. The epoxy ethers of monofunctional alcohols may be selected from the group of ethyl glycidyl ether, n-propyl glycidyl ether, isopropyl glycidyl ether, n-butyl glycidyl ether, isobutyl glycidyl ether, t-butyl glycidyl ether, n-amyl glycidyl ether, iso-amyl glycidyl ether, t-amyl glycidyl ether, n-hexyl glycidyl ether, cetyl glycidyl ether, benzyl glycidyl ether, 2,3-dimethoxy benzyl glycidyl ether, diacetone glycidyl ether, n-dodecyl glycidyl ether, 2-ethyl hexyl glycidyl ether, and combinations thereof.

The multifunctional amine compound may be selected from the group of ethylene diamine, butylene diamine, diethylene triamine, hexamethylene triamine, triethylene tetramine, polyoxyethylene amines, 2-methyl pentamethylene diamine, 1,3-diamino propane, 1,4-diamino butane, 1,5-diamino pentane, 1,6-diamino hexane, 1,2-diamino cyclohexane, isophorone diamine, tetraethylene pentamine, 4,4'-methylene-bis-cyclohexyl amine, bis(3-methyl-4aminocyclohexyl) methane, 2,2-bis(3-methyl-4-aminocyclohexyl) propane, 2,6-bis(aminomethyl) norborane, cyclohexane diamine, 3,4-diamino furan, phenylene diamine, 2,4-diamino toluene, polyalkylene oxide diamine, polyalkylene oxide triamine, 2,6 diamino toluene and the combinations thereof.

According to another aspect of the present disclosure, the epoxy esters of monofunctional alcohols are selected from the group of glycidyl acetate, glycidyl neopentanoate, glycidyl 2-ethylhexanoate, glycidyl neodecanoate and combinations thereof. Alternatively, the addition product is formed by reacting diethylene triamine (DETA) with one or more polyfunctional epoxy compounds and/or monofunctional epoxy compounds selected from the group of ethylene glycol diglycidyl ether (EGDGE), n-butyl glycidyl ether (BGE), and polypropylene glycol diglycidyl ether (PPGDGE), and polyethylene glycol diglycidyl ether (PEGDGE).

According to another aspect of the present disclosure, a polymeric adduct is provided that has a backbone comprising a plurality of segments with amine functional groups and hydroxyl functional groups. The polymeric adduct has a number average molecular weight in the range of about 500 to about 1,000,000 unified Daltons and comprises a nitrogen atom percentage of 5 to about 35. The polymeric adduct is water soluble and is formed by reacting an amine compound with one or more epoxy compounds, such that there are 1.3 to 3.8 reactive amine functional groups per reactive epoxy functional group. The polymeric adduct may have the formula (F-1) as previously described above and further defined herein.

According to yet another aspect of the present disclosure, an aqueous solution comprising the polymeric adducts, or the addition product prepared according to the teachings of the present disclosure is provided. The aqueous solution has a viscosity in the range of about 100 centipoise to about 100,000 centipoise and a pH value of about 8 to about 12 when the solution comprises 70 wt. % of the polymeric or polymeric adduct dissolved in water. The aqueous solution exhibits less than about a 30% viscosity change and maintains a transparent appearance when maintained at a temperature of 50° C. for 30 days.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
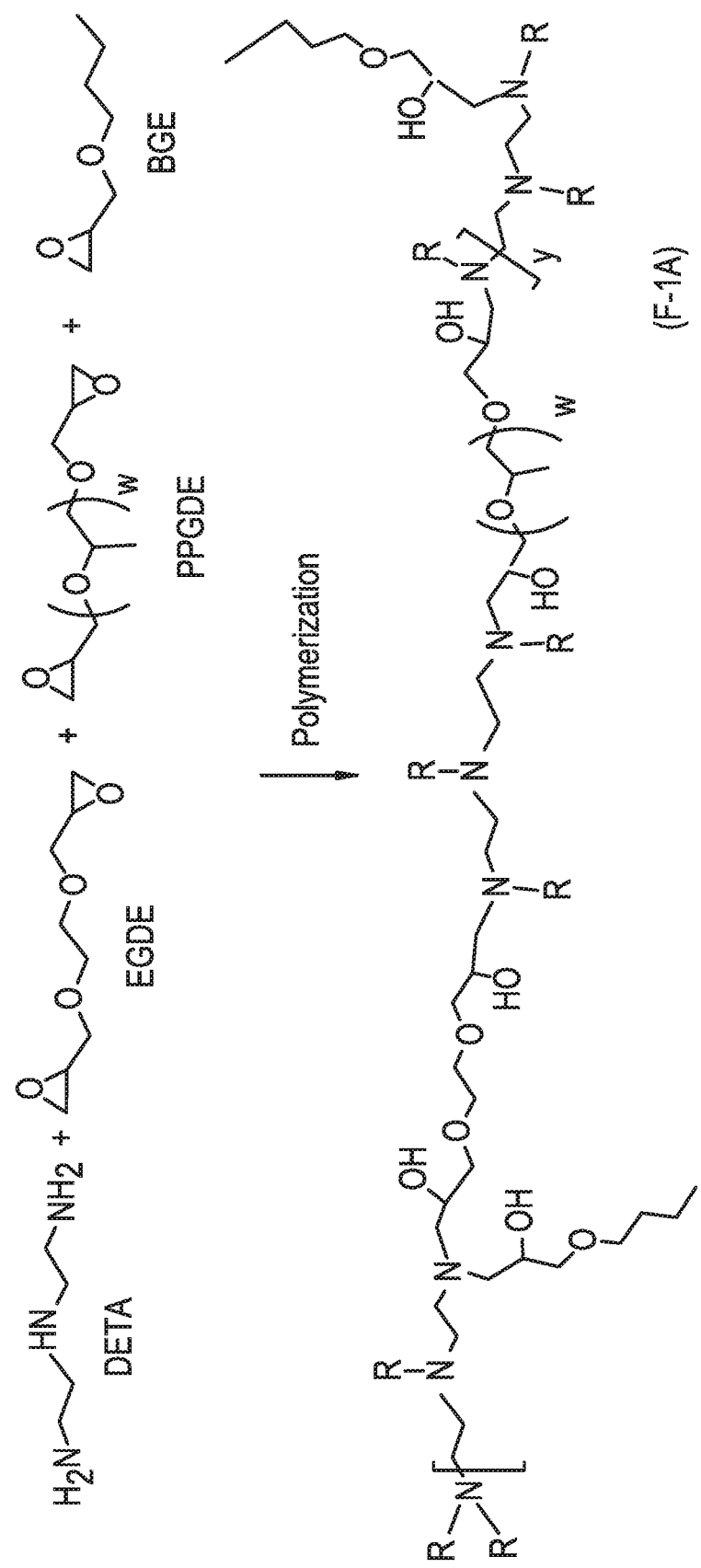
FIG. 1 is a representation of the polymeric adducts formed according to the teachings of the present disclosure.

The following description is merely exemplary in nature and is in no way intended to limit the present disclosure or its application or uses. It should be understood that throughout the description, corresponding reference numerals indicate like or corresponding parts and features.

The present disclosure generally relates to water soluble polymers and polymeric adducts, as well as aqueous solutions made using these polymers and/or adducts. According to one aspect of the present disclosure, the polymers and polymer adducts may correspond to a formula defined as (F-1) below, where w, x, y, and z are integers ranging between 1 and 20, 0 and 10, between 1 and 10,000, and between 0 and 10,000, respectively. The integer y may, alternatively, be 10 to about 5,000. When desirable, the integer y may be about 20 to about 1,000.

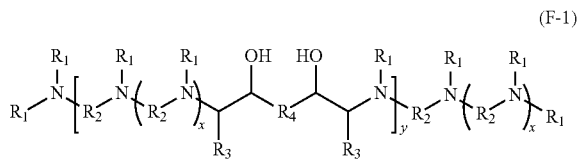
(F-1)

where $R_4$ is alkyl or

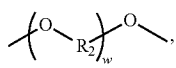

and $R_3$ is hydrogen or alkyl, and $R_2$ is alkyl, and $R_1$ is H, alkyl hydroxide, alkyl ether hydroxide, or

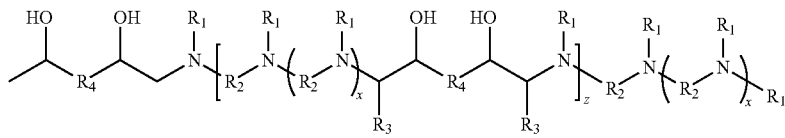

These polymers and polymeric adducts may comprise 1.3 to 3.8 amine functional groups per hydroxyl functional group. Alternatively, the polymers and polymeric adducts may comprise 1.5 to 3.5 amine functional groups per hydroxyl functional group; alternatively, 2.0 to 3.0 amine functional groups per hydroxyl functional group.

In the context of the present disclosure, the term "water soluble" means that the polymers or adducts become a homogeneous and transparent solution when blended with water and without the addition of water-compatibilizing solvents. The term "transparent solution" means that the solution transmits 90% or more of impinging visible light having a wavelength of 540 nm. Transmittance of visible light having a 540 nm wavelength may be measured via any conventional spectrophotometry method, such as Genesys 20 (Thermo Spectronic). The term "adducts" represents compounds that are formed by the combination of amine and epoxy reactants, such as via covalent bonds. The term "sufficiently stable" means that the aqueous solution exhibits less than about a 30% viscosity change and maintains a transparent appearance when maintained at a temperature of 50° C. for 30 days. The viscosity is determined according to ASTM method D-2196 (ASTM International, West Conshohocken, Pa.).

The polymers and polymeric adducts of the present invention are formed as the addition product of amine and epoxy compounds. More specifically, the reactants may comprise, consist of, or consist essentially of at least one multifunctional amine compound and one or more epoxy compounds; alternatively, a plurality of epoxy compounds; alternatively, three or more epoxy compounds are utilized. The epoxy compounds may include polyfunctional epoxy compounds, monofunctional epoxy compounds, or a combination thereof. The polymeric adducts may be prepared by reacting an amine compound with one or more epoxy compounds, such that there are between 1.3 to 3.8 reactive amine functional groups per reactive epoxy functional group; alternatively, between 1.5 to 3.5 reactive amine functional groups per reactive epoxy functional group; alternatively, between 2 to 3 reactive amine functional groups per reactive epoxy functional group.

The polymeric adducts also exhibit a number average molecular weight that is in the range of about 500 to about 1,000,000 unified amu or Daltons measured by gel permeation chromatography using Ultrahydrogel columns from Waters Corporation and water as mobile phase; alternatively between 500 to 500,000 Daltons; alternatively, between between 500 to 200,000 Daltons. The polymeric adducts also comprise a nitrogen atom percentage in the range of 5 to about 35%; wherein the nitrogen atom percentage ($N_{atom}$ %) is calculated according to Equation (1):

$$N_{atom}\% = 100 \times \frac{\sum (14.007 \times N_A \times M_A)}{W_R}, \quad \text{Eq. (1)}$$

where $N_A$ is the number of nitrogen atoms per multifunctional amine, $M_A$ is the molar quantity of the multifunctional amine, and $W_R$ is the total weight of the reactants. Alternatively, the nitrogen atom percentage of the polymeric adducts is between about 10% to about 25%.

According to one aspect of the present disclosure, an aqueous solution of the polymeric adducts is prepared by mixing, dispersing, or diluting the polymeric adducts with water. The aqueous solution of the polymeric adducts is sufficiently stable and exhibits a viscosity that is in the range of about 100 centipoise to about 100,000 centipoise when the solution comprises about 70 wt. % of the polymeric adducts dissolved in water. When desirable the viscosity is between about between 100 centipoise to about 50,000 centipoise; alternatively, between 100 centipoise to 10,000 centipoise. The weight percent of the polymeric adducts in aqueous solution may be measured according to ASTM test method D-1259 (ASTM International, West Conshohocken, Pa.).

The aqueous solution also exhibits a pH value of about 8 to about 12; alternatively, about 9 to about 11; alternatively, less than about 10.5. The aqueous solution retains sufficient stability in that it exhibits less than about a 30% viscosity change when maintained at a temperature of 50° C. for 30 days. When desirable, the viscosity change when exposed to a temperature of 50° C. for one month exhibited by the aqueous solutions is between about 0% and 20%.

When blended with an anionically-stabilized latex to form a latex product, the water soluble polymeric adducts of the present disclosure surprisingly exhibit stability at a pH value that is below 10.0. An anionically-stabilized latex represents an emulsion of polymer particles dispersed in an aqueous medium. The pH value of the blends of the latex and polymeric adducts is measured using a pH probe at 25° C. This stability allows the polymeric adducts to be effectively utilized as an additive for shortening the setting time of a latex product. Further details regarding the use of the water soluble polymeric adducts of the present disclosure are provided in co-pending U.S. Provisional Applications, U.S. Ser. Nos. 62/183,324 and 62/319,465 entitled "Latex Products Having Polymers or Polymeric Adducts as Quick-Setting Additives" and U.S. Ser. Nos. 62/181,291 and 62/319,476 entitled "Quick-Setting Coating Compositions with Stability at Low pH and Water Resistance", the entire contents of which are hereby incorporated by reference.

The basicity and molecular weight of the polymeric adducts can be manipulated to prevent their interaction with polymer particles during the storage of the latex product and to promote coagulation with the polymer particles during application (i.e., coating formation). The reaction utilized to generate the polymeric adducts of the present disclosure offers more flexibility to control basicity and molecular weight than provided in conventional polyamines, such as polyalkylene imines and acrylic polyamines Thus the polymeric adducts of the present disclosure can be tailored to function with many different latex products that exhibit their own unique set of physicochemical properties.

The basicity of the multifunctional amines that are used to form the polymeric adducts can be determined by the nature of amine (e.g., aliphatic or aromatic), the number of substituents on the nitrogen atom, the degree of steric hindrance surrounding the nitrogen atom, the water solubility of the protonated amine, and the nitrogen atom density per polymer chain as further described herein. The basicity of the polymeric adducts may be manipulated by varying the ratios between the aliphatic and the aromatic multifunctional amines. For example, polymeric adducts formed from an aliphatic amine are more basic than polymeric adducts formed using an aromatic amine. When desirable, the ratio of aromatic amine to aliphatic amine is in the range of 0 to 2; alternatively, between about 0 to about 1.5.

The basicity of the polymeric adducts of the present disclosure may also be manipulated by the number of alkyl substituents on the nitrogen atom of the amine functional group(s) in the polymeric adducts. According to one aspect of the present disclosure, the number of tertiary amine groups may be increased by further reaction of the polyamine with monoepoxy compounds, as this increases the degree of alkyl substitution on the nitrogen atom.

The water solubility of the protonated polymeric adducts dictates the basicity exhibited by these adducts dissolved in an aqueous medium. High solubility of the polymeric adducts in water allows for easy formation and mobility of the ions in the aqueous phase. The water solubility of the polymeric adducts is mainly determined by its hydrophilicity. The hydrophilicity of the polymeric adducts may be manipulated by modifying the carbon chain length of the multifunctional amine and the multifunctional epoxy reactants. For instance, decreasing the aliphatic chain length of either the amine or epoxy reactant provides greater hydrophilicity. Furthermore, the hydrophilicity of the polymeric adducts also increases as the linkage between the amine groups in the multifunctional amine reactant and the epoxy groups in the multifunctional epoxy reactant are varied from hydrocarbon to propylene oxide or ethylene oxide groups. When desirable, the alkylene oxide content is in the range of 0 to 30 wt. %; alternatively, between about 0 wt. % and about 20 wt. %, even more preferably 0 to 10 wt %.

A higher nitrogen atom density per polymer chain can also increase the basicity of polymeric adducts. The most suitable nitrogen density may be subject to the particular latex particles that are blended with the polymeric adducts of the present disclosure in order to provide for an optimal balance between storage stability and fast-setting property for the latex product. The nitrogen atom density may be manipulated by the proper selection of the amount and the molecular chain length of the multifunctional amine, the multifunctional epoxy compound, and/or the monofunctional epoxy compound. The use of reactants with shorter hydrocarbon chain lengths will generate polymeric adducts with greater nitrogen density. When desirable, the nitrogen atom percentage is in the range of 5 to about 35%; alternatively, in the range of about 10% to about 30%.

The molecular weight of the polymeric adducts can affect the storage stability and fast-setting property of the latex products formed therefrom. The molecular weight of the polymeric adducts of the present invention can be manipulated by the proper selection of the number of amine functional groups in the multifunctional amine reactant, the number of epoxy groups in the epoxy reactants, and/or the equivalent ratio of amine to epoxy functional groups present. A higher molecular weight can be obtained using a multifunctional amine reactant having a higher number of amine functional groups, a higher number of epoxy groups in the epoxy reactants, or when the ratio of amine to epoxide is close to unity (e.g., 1:1). The number average molecular weight of the polymeric adducts is in the range of 500 to 1,000,000 Daltons; alternatively between 500 to 500,000 Daltons; alternatively, between 500 to 200,000 Daltons.

The polyfunctional epoxy compounds may comprise, consist of, or consist essentially of epoxides of unsaturated hydrocarbons and fatty acids/oils, epoxy ethers of multifunctional alcohols, or mixtures and combinations thereof. The epoxides of unsaturated hydrocarbons and fatty acids/oils may include, without limitation, the epoxide of vinyl cyclohexene, dicyclopentadiene, cyclohexadiene, cyclododecadiene, cyclododecatriene, isoprene, 1,6-hexadiene, butadiene, polybutadiene, divinyl benzene, castor oil, soybean oil and mixtures or combinations thereof. Among those, epoxy ethers of multifunctional alcohols are preferred. The epoxy ethers of multifunctional alcohols may include, but not be limited to, trimethyol propane triglycidyl ether, pentaerythritol tetraglycidyl ether, trimethyol ethane triglycidyl ether, ethylene glycol diglycidyl ether, sorbitol glycidyl ethers, 2-methyl-1,3-propane diol diglycidyl ether, neopentyl glycol diglycidyl ether, 2,2,4-trimethyl pentanediol diglycidyl ether, propylene glycol diglycidyl ether, hydrogenated bisphenol A diglycidyl ether, 1,4-butanediol diglycidyl ether, 1,6-hexanediol diglycidyl ether, polyethylene glycol diglycidyl ether, polypropylene glycol diglycidyl ether, and combinations thereof. Among those, ethylene glycol diglycidyl ether and propylene glycol are preferred. Alternatively, the second reactant may include polypropylene glycol diglycidyl ether, or polyethylene glycol diglycidyl ether, and mixtures thereof.

The monofunctional epoxy compounds may comprise, consist of, or consist essentially of epoxy ethers of monofunctional alcohols, epoxy esters of monofunctional alcohols, or mixture and combinations thereof. The epoxy ethers of monofunctional alcohols may include, without limitation, ethyl glycidyl ether, n-propyl glycidyl ether, isopropyl glycidyl ether, n-butyl glycidyl ether, isobutyl glycidyl ether, t-butyl glycidyl ether, n-amyl glycidyl ether, iso-amyl glycidyl ether, t-amyl glycidyl ether, n-hexyl glycidyl ether, cetyl glycidyl ether, benzyl glycidyl ether, 2,3-dimethoxy benzyl glycidyl ether, diacetone glycidyl ether, n-dodecyl glycidyl ether, 2-ethyl hexyl glycidyl ether, and combinations thereof. Among those, n-butyl glycidyl ether and 2-ethyl hexyl glycidyl ether are preferred. The monofunctional epoxy esters of monofunctional alcohols may include, but not be limited to, glycidyl acetate, glycidyl neopentanoate, glycidyl 2-ethylhexanoate, glycidyl neodecanoate and combinations thereof. Among those, glycidyl neodecanoate is preferred.

Preferred epoxy combinations include ethylene glycol diglycidyl ether/n-butyl glycidyl ether, ethylene glycol diglycidyl ether/2-ethyl hexyl glycidyl ether, propylene glycol diglycidyl ether/n-butyl glycidyl ether, propylene glycol diglycidyl ether/2-ethyl hexyl glycidyl ether, ethylene glycol diglycidyl ether/n-butyl glycidyl ether/polypropylene glycol diglycidyl ether, ethylene glycol diglycidyl ether/n-butyl glycidyl ether/polyethylene glycol diglycidyl ether, propylene glycol diglycidyl ether/n-butyl glycidyl ether/polypropylene glycol diglycidyl ether, propylene glycol diglycidyl ether/n-butyl glycidyl ether/polyethylene glycol diglycidyl ether.

The multifunctional amines may include, without limitation, ethylene diamine, butylene diamine, diethylene triamine, hexamethylene triamine, triethylene tetramine, polyoxyethylene amines, 2-methyl pentamethylene diamine, 1,3-diamino propane, 1,4-diamino butane, 1,5-diamino pentane, 1,6-diamino hexane, 1,2-diamino cyclohexane, isophorone diamine, tetraethylene pentamine, 4,4'-methylene-bis-cyclohexyl amine, bis(3-methyl-4-aminocyclohexyl) methane, 2,2-bis(3-methyl-4-aminocyclohexyl) propane, 2,6-bis(aminomethyl) norborane, cyclohexane diamine, 3,4-diamino furan, phenylene diamine, 2,4-diamino toluene, 2,6-diamino toluene, polyalkylene oxide diamine, polyalkylene oxide triamine, and the mixtures or combinations thereof. Among those, 1,6-diamino hexane, diethylene triamine, hexamethylene triamine, triethylene tetramine are preferred.

Preferred multifunctional amine combinations include 1,6-diamino hexane/diethylene triamine and ethylene diamine/diethylene triamine.

Figure 2:
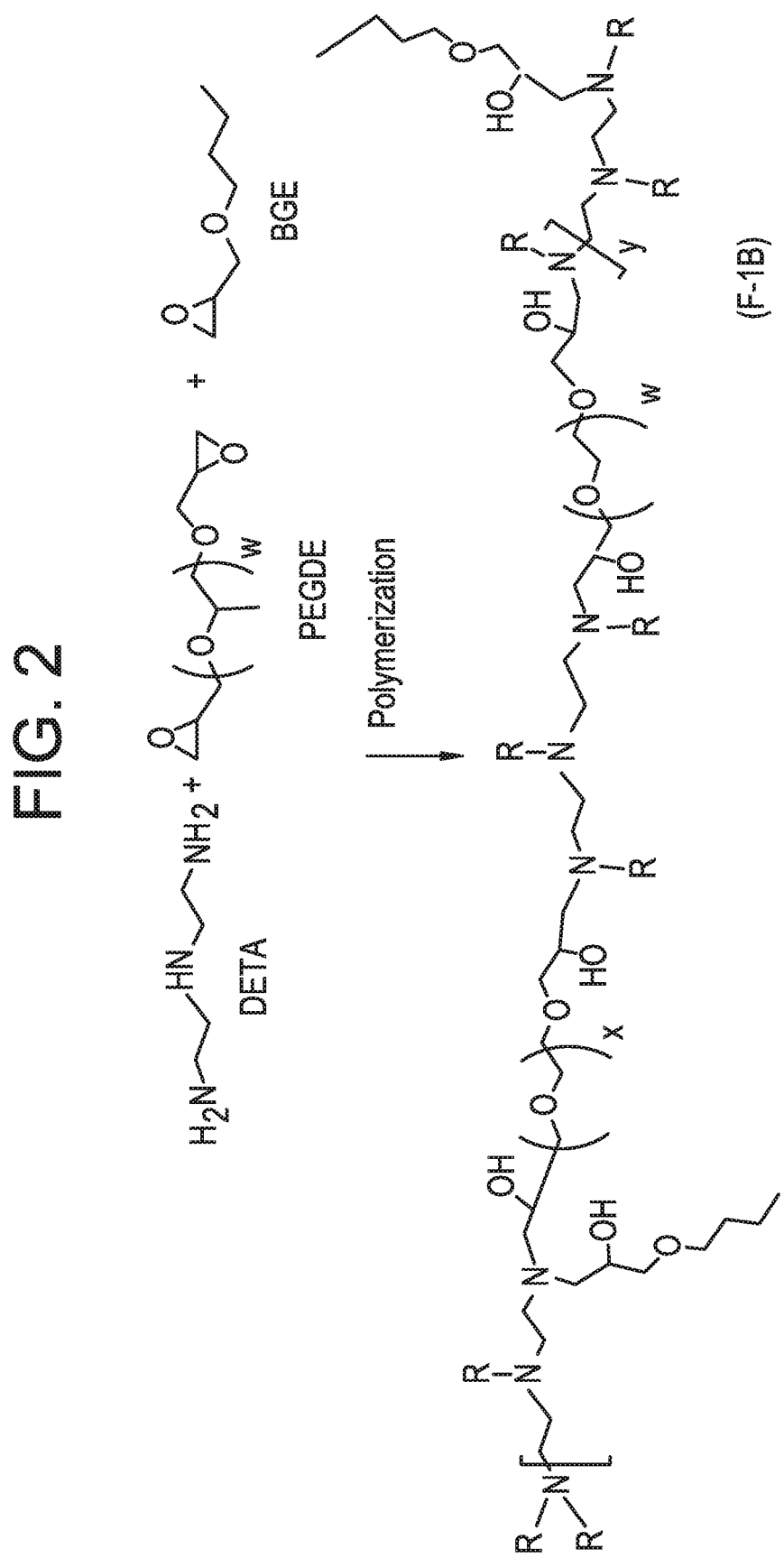
FIG. 2 is another representation of the polymeric adducts formed according to the teachings of the present disclosure.

According to another aspect of the present disclosure, the amine compound or reactant is provided in the range of about 25 wt. % to about 60 wt. % and the epoxy compounds or reactants are provided in the range of about 40 wt. % to about 75 wt. % relative to the combined weight of the amine and epoxy reactants. Alternatively, the amine reactant is provided in the range of about 30 wt. % to about 50 wt. % and the epoxy reactants are provided in the range of about 50 wt. % to about 70 wt. % relative to the combined weight of the amine and epoxy reactants. Referring now to FIGS. 1 and 2, when desirable, the amine reactant may be diethylene triamine (DETA) and the epoxy reactants may be a mixture of ethylene glycol diglycidyl ether (EGDGE), n-butyl glycidyl ether (BGE), and polypropylene oxide diglycidyl ether (PPGDGE) or polyethylene glycol diglycidyl ether (PEGDGE). The resulting polymers and polymeric adducts formed therefrom may be represented by formula (F-1A) or (F-1B).

(F-1A)

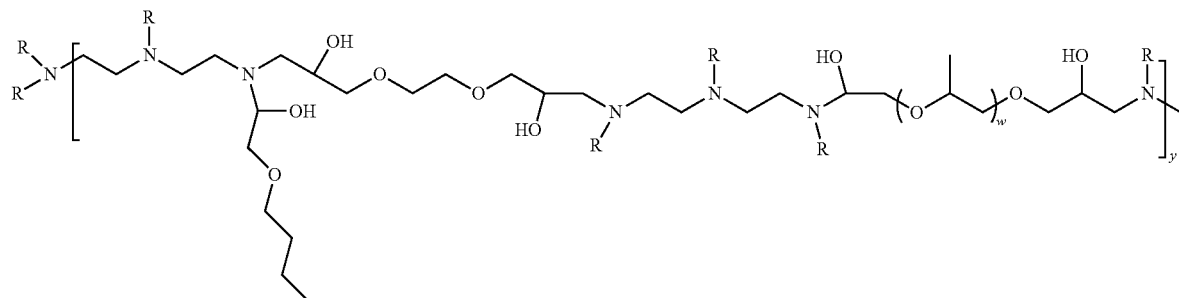

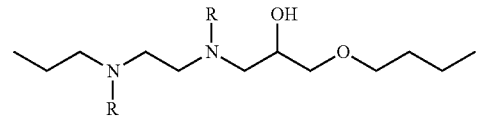

(F-1B)

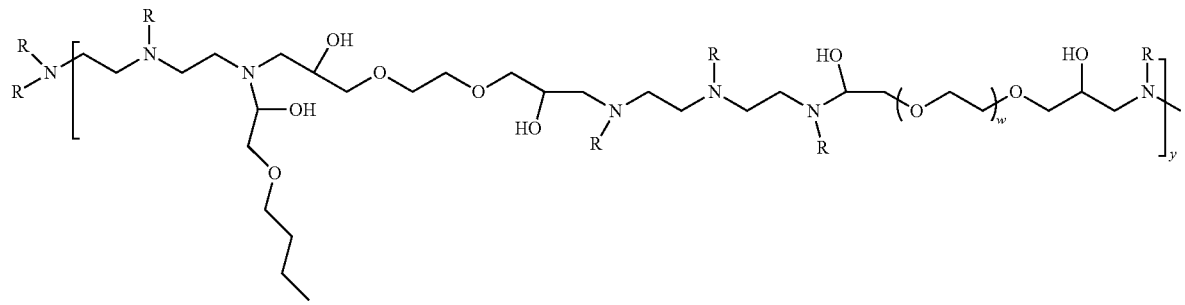

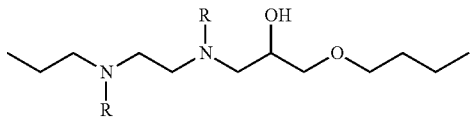

According to yet another aspect of the present disclosure, the polymeric adducts may have a polymeric backbone that comprises, consists of, or consists essentially of a plurality of segments with amine functional groups and hydroxyl functional groups. More specifically, the polymeric adduct may comprise alkylene ether and hydroxyl functional groups in the polymer backbone.

This polymeric adduct may be produced by reacting a multifunctional amine compound with multifunctional and/or monofunctional epoxide compounds as previously describe above. This polymeric adduct is water soluble, has a number average molecular weight that is in the range of about 500 to about 1,000,000 unified amu or Daltons, and comprises a nitrogen atom percentage of 5 to about 35%. Alternatively, the number average molecular weight of the polymeric adduct is between 500 to 500,000 Daltons; alternatively, between about 500 to 200,000 Daltons.

The polymeric adduct may be formed by reacting an amine compound with one or more epoxy compounds, such that there are 1.3 to 3.8 reactive amine functional groups per reactive epoxy functional group; alternatively, between 1.5 to 3.5 amine functional groups per epoxy functional group; alternatively, between 2 to 3 amine functional groups per epoxy functional group. The polymeric adduct may have a structure that corresponds to formula (F-1), as previously defined herein.

The reaction utilized to generate the polymeric adduct provides flexibility for controlling the carbon chain length between the amine functional groups and offering various degrees of hydrophobicity to the quick setting additive. This flexibility allows a manufacturer to tailor the polymeric structure of the adducts by preselecting the desired multifunctional amine compound(s) and multifunctional and/or monofunctional epoxy compound(s).

Aspects of the invention are described below.

1. A polymer comprising the formula:

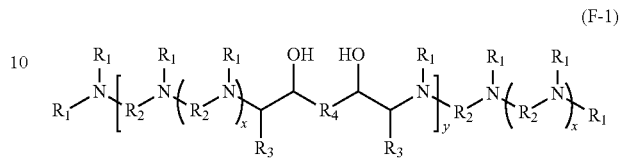

(F-1)

where $R_4$ is alkyl or

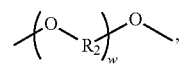

and $R_3$ is hydrogen or alkyl, and $R_2$ is alkyl, and $R_1$ is H, alkyl hydroxide, alkyl ether hydroxide, or

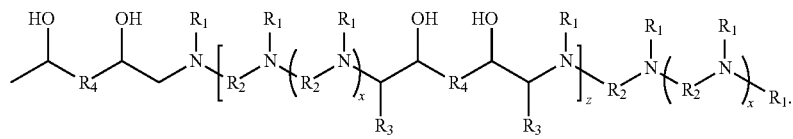

wherein, w, x, y, and z are integers ranging between 1 and 20 between 0 and 10, between 1 and 10,000, and between 0 and 10,000, respectively.

2. The polymer according to claim 1, wherein the polymer comprises 1.3 to 3.8 amine functional groups per hydroxyl functional group.

3. The polymer according to any of claim 1 or 2, wherein the polymer is water soluble and has a number average molecular weight in the range of about 500 to about 1,000,000 Daltons.

4. The polymer according to any of claims 1-3, wherein the polymer is selected as either

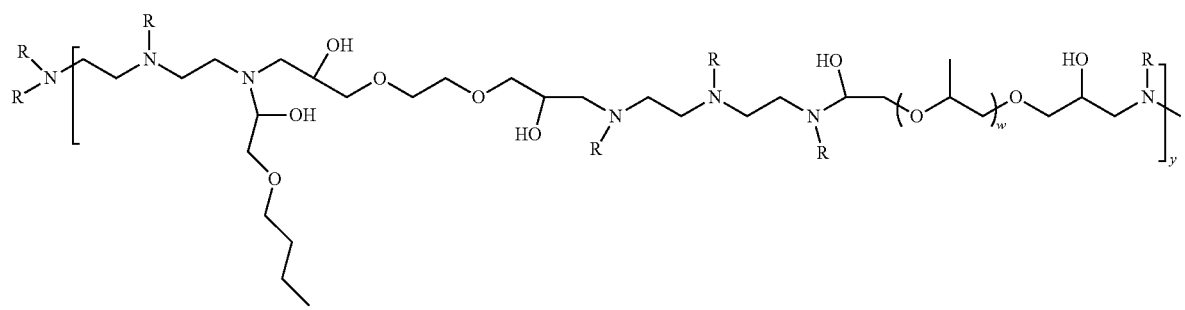

(F-1A)

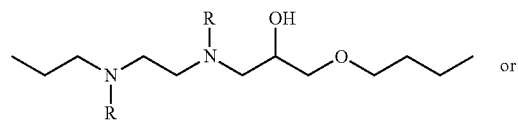

or

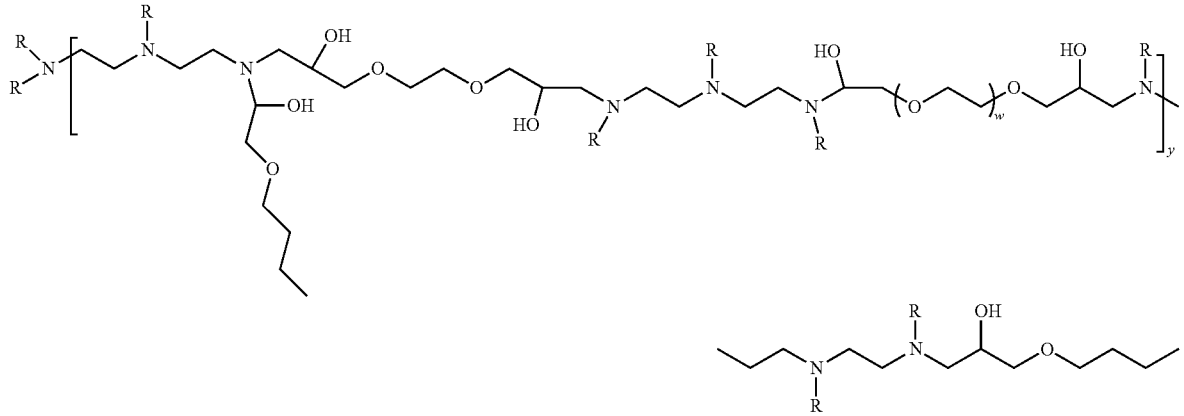

(F-1B)

5. An addition product of at least one multifunctional amine compound reacted with one or more polyfunctional epoxy compounds, one or more monofunctional epoxy compounds, or a combination thereof;
wherein the amine compound and the one or more epoxy compounds provide 1.3 to 3.8 reactive amine functional groups per reactive epoxy functional group;
wherein the addition product is water soluble, has a number average molecular weight in the range of about 500 to about 1,000,000 Daltons; and a nitrogen atom percentage of 5 to about 35%.

6. The addition product according to claim 5, wherein the polyfunctional epoxy compounds comprise epoxides of unsaturated hydrocarbons and fatty acids/oils, epoxy ethers of multifunctional alcohols, or combinations thereof and the monofunctional epoxy compounds comprise epoxy ethers of monofunctional alcohols, epoxy esters of monofunctional alcohols, or combinations thereof.

7. The addition product according to claim 6, wherein the epoxides of unsaturated hydrocarbons and fatty acids/oils are selected from the group of the epoxides of vinyl cyclohexene, dicyclopentadiene, cyclohexadiene, cyclododecadiene, cyclododecatriene, isoprene, 1,6-hexadiene, butadiene, polybutadiene, divinyl benzene, castor oil, soybean oil, and combinations thereof;
wherein the epoxy ethers of multifunctional alcohols are selected from the group of trimethyol propane triglycidyl ether, pentaerythritol tetraglycidyl ether, trimethyol ethane triglycidyl ether, ethylene glycol diglycidyl ether, sorbitol glycidyl ethers, 2-methyl-1,3-propane diol diglycidyl ether, neopentyl glycol diglycidyl ether, 2,2,4-trimethyl pentanediol diglycidyl ether, propylene glycol diglycidyl ether, hydrogenated bisphenol A diglycidyl ether, 1,4-butanediol diglycidyl ether, 1,6-hexanediol diglycidyl ether, polyethylene glycol diglycidyl ether, polypropylene glycol diglycidyl ether, and combinations thereof;
wherein the epoxy ethers of monofunctional alcohols are selected from the group of ethyl glycidyl ether, n-propyl glycidyl ether, isopropyl glycidyl ether, n-butyl glycidyl ether, isobutyl glycidyl ether, t-butyl glycidyl ether, n-amyl glycidyl ether, iso-amyl glycidyl ether, t-amyl glycidyl ether, n-hexyl glycidyl ether, cetyl glycidyl ether, benzyl glycidyl ether, 2,3-dimethoxy benzyl glycidyl ether, diacetone glycidyl ether, n-dodecyl glycidyl ether, 2-ethyl hexyl glycidyl ether, and combinations thereof;
wherein the epoxy esters of monofunctional alcohols are selected from the group of glycidyl acetate, glycidyl neopentanoate, glycidyl 2-ethylhexanoate, glycidyl neodecanoate and combinations thereof.

8. The addition product according to any of claims 4-7, wherein the at least one multifunctional amine compound is selected from the group of ethylene diamine, butylene diamine, diethylene triamine, hexamethylene triamine, triethylene tetramine, polyoxyethylene amines, 2-methyl pentamethylene diamine, 1,3-diamino propane, 1,4-diamino butane, 1,5-diamino pentane, 1,6-diamino hexane, 1,2-diamino cyclohexane, isophorone diamine, tetraethylene pentamine, 4,4'-methylene-bis-cyclohexyl amine, bis(3-methyl-4aminocyclohexyl) methane, 2,2-bis(3-methyl-4-aminocyclohexyl) propane, 2,6-bis(aminomethyl) norborane, cyclohexane diamine, 3,4-diamino furan, phenylene diamine, 2,4-diamino toluene, polyalkylene oxide diamine, polyalkylene oxide triamine, 2,6 diamino toluene and the combinations thereof.

9. The addition product according to any of claims 4-8, wherein the at least one multifunctional amine compound is diethylene triamine (DETA) and the plurality of polyfunctional epoxy compounds and/or monofunctional epoxy compounds are selected from the group of ethylene glycol diglycidyl ether (EGDGE), n-butyl glycidyl ether (BGE), and polypropylene glycidyl diglycidyl ether (PPGDGE), and polyethylene glycidyl diglycidyl ether (PEGDGE).

10. The addition product according to any of claims 4-9, wherein the addition product has the formula:

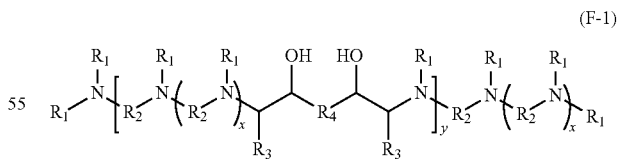

(F-1)

where R4 is alkyl or

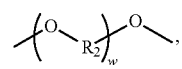

and $R_3$ is hydrogen or alkyl, and $R_2$ is alkyl, and $R_1$ is H, alkyl hydroxide, alkyl ether hydroxide, or

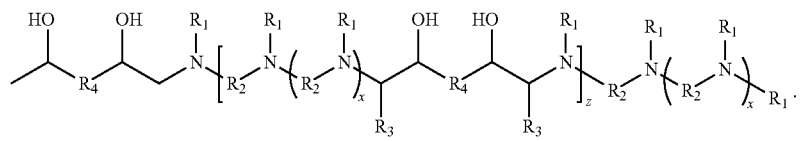

wherein, w, x, y, and z are integers ranging between 1 and 20, between 0 and 10, between 1 and 10,000, and between 0 and 10,000, respectively.

11. The addition product according to claim 10, wherein the addition product is selected as either

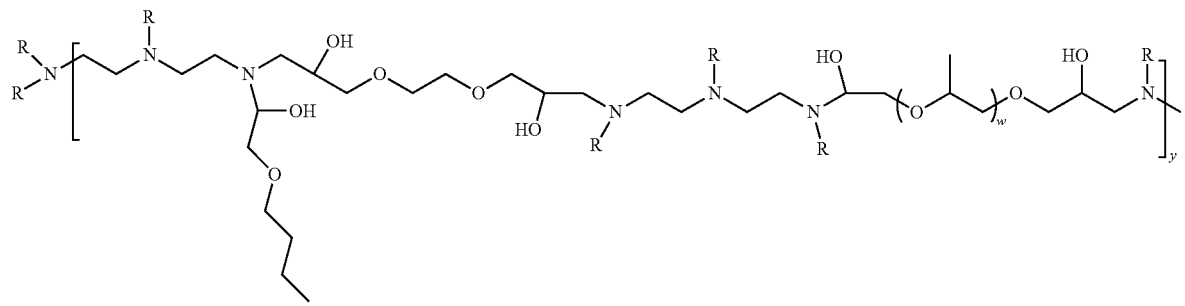

(F-1A)

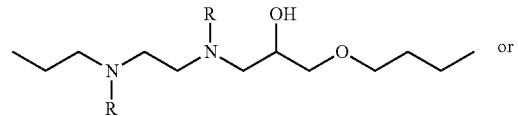 or

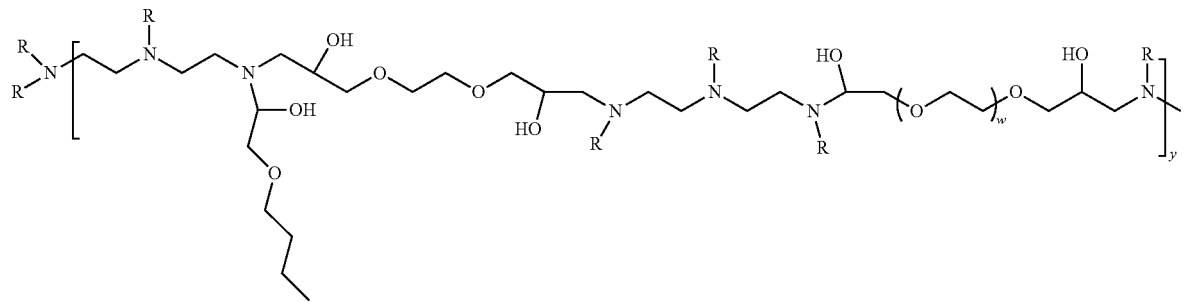

(F-1B)

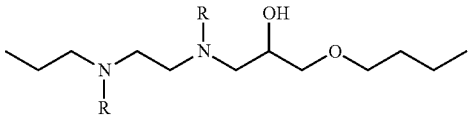

12. A polymeric adduct having a backbone comprising a plurality of segments with amine functional groups and hydroxyl functional groups, the polymeric adduct having a number average molecular weight in the range of about 500 to about 1,000,000 Daltons;

wherein the polymeric adduct is water soluble and formed by reacting an amine compound with one or more epoxy compounds, such that there are 1.3 to 3.8 reactive amine functional groups per reactive epoxy functional group.

13. The polymeric adduct of claim 12, wherein the polymeric adduct has the formula:

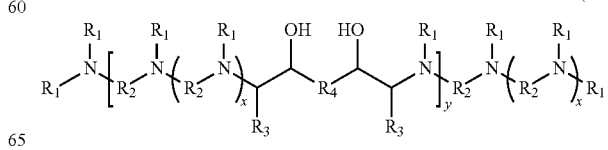

(F-1)

where $R_4$ is alkyl or

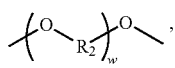

and $R_3$ is hydrogen or alkyl, and $R_2$ is alkyl, and $R_1$ is H, alkyl hydroxide, alkyl ether hydroxide, or

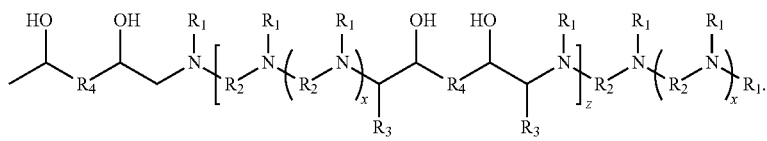

wherein, w, x, y, and z are integers ranging between 1 and 20, between 0 and 10, between 1 and 10,000, and between 0 and 10,000, respectively.

14. The polymeric adduct of claim 13, wherein the polymeric adduct is selected as either

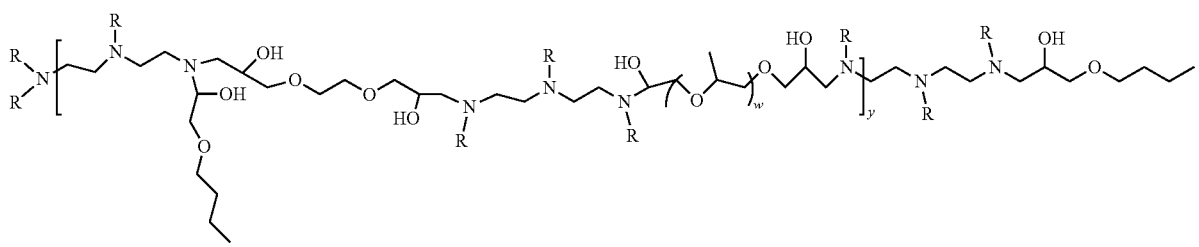

(F-1A)

or

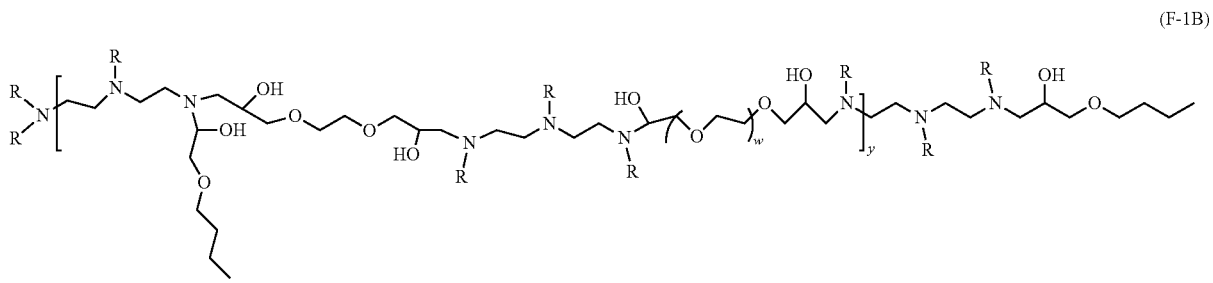

(F-1B)

15. An aqueous solution of the polymeric adduct according to any of claims 1-4; wherein the aqueous solution has a viscosity in the range of about 100 centipoise to about 100,000 centipoise and a pH value of about 8 to about 12 when the solution comprises 70 wt. % of the polymeric adduct dissolved in water; the aqueous solution exhibiting less than about a 30% viscosity change and maintain the transparent appearance when maintained at a temperature of 50° C. for 30 days.

16. An aqueous solution of the addition product according to any of claims 5-11; wherein, the aqueous solution has a pH value of about 8 to about 12 and a viscosity in the range of about 100 centipoise to about 100,000 centipoise when the solution comprises 70 wt. % of the polymeric adducts dissolved in water; the aqueous solution exhibiting less than about a 30% viscosity change and maintaining a transparent appearance when maintained at a temperature of 50° C. for 30 days.

17. An aqueous solution of the polymeric adduct according to any of claims 12-14; wherein, the aqueous solution has a pH value of about 8 to about 12 and a viscosity in the range of about 100 centipoise to about 100,000 centipoise when the solution comprises 70 wt. % of the polymeric adduct dispersed in water; the aqueous solution exhibiting less than about a 30% viscosity change and maintaining a transparent appearance when maintained at a temperature of 50° C. for 30 days.

The following Table 1 includes a non-exhaustive list of possible amine epoxy combinations that may be used to form the polymeric adducts according to the teachings of the present disclosure.

TABLE 1

Several Specific Combinations of Reactants Used to Form Polymeric Adducts

| Amine | Epoxy 1 | Epoxy 2 | Epoxy 3 |
|---|---|---|---|
| DETA | EGDGE | BGE | PPGDGE |
| DETA | EGDGE | — | — |
| DETA | EGDGE | BGE | — |
| DETA | EGDGE | EHGE | PPGDGE |
| DETA | EGDGE | BGE | PEGDGE |

The reactants associated with the abbreviations used in Table 1 include: diethylene triamine (DETA); ethylene glycol diglycidyl ether (EGDGE); n-butyl glycidyl ether (BGE); 2-ethylhexyl glycidyl ether (EHGE); polypropylene glycol diglycidyl ether (PPGDGE); and polyethylene glycol diglycidyl ether (PEGDGE).

Experiment 1—Preparation of Polymeric Adducts

In this example, polymeric adducts are formed according to the reaction scheme shown in FIG. 1. A total of 60 parts of diethylene triamine (DETA) is charged into a reaction vessel equipped with a nitrogen blanket. A total of 24 parts of ethylene glycol diglycidyl ether (EGDGE), 72 parts of n-butyl glycidyl ether (BGE), and 14 parts of polypropylene glycol diglycidyl ether (PPGDGE) having about 640 number average molecular weight are mixed in a beaker and transferred into an addition funnel. Under mild stirring, the reaction vessel temperature is raised to 80° C. The contents of the addition funnel are added into the stirred reaction vessel gradually over one hour while maintaining the temperature of the reaction vessel below 110° C. The reaction vessel is held at 80° C. for 2.5 hours after the addition of the mixture of EGDGE, BGE, and PPGDGE is completed. Then 73 parts of de-ionized water is charged into the reaction vessel and mixed well to form an aqueous solution. The resulting aqueous solution exhibits a pH value of 10.5 and a viscosity of 400 centipoise (at 25° C.), as well as being found to be sufficiently stable.

Experiment 2—Testing of Polymeric Adducts

To evaluate the relative stability of the blend of anionically-stabilized latex particles and the polymeric adducts of the present disclosure, a latex product was adjusted to pH value of 9.0 using aqueous ammonia. Subsequently, the polymeric adducts prepared in Experiment 1 were added to the latex at 2.0 w/w % based on latex solids. A separate, comparative sample was also prepared by adding conventional polyethyleneimine to a similar amount of latex at 2.0 w/w % based on the latex solids.

The resulting latex products are considered stable when they are sufficiently free of grit and free-flowing. Failure occurs when a latex product becomes coagulated and is unable to be agitated. Dry times are evaluated on an 8 mil drawdown of the latex adjusted to pH 10.5. "Tack free" is defined as the time after initial drawdown when the film does not have a tacky feeling when touched with a human finger. "Dry through" is defined as the time after initial drawdown when the film does not break when gentle pressure and twisting is applied with a human finger (see ASTM D-1640, ASTM International, West Conshohoken, Pa.). As shown in Table 2, the latex product containing the polymeric adducts of the present disclosure demonstrate stability at 9.0 pH, while the conventional latex product becomes unstable and coagulates.

TABLE 2

Stability of the blend of latex and amines at
9.0 pH with 2.0 w/w % based on latex solids

| Latex Description | Latex Product with Conventional Polyethyleneimine | Latex Product with Polymers or Polymeric Adducts |
|---|---|---|
| Acrylic emulsion (Encor ® 626, Arkema) | Coagulated | Stable |
| Acrylic emulsion (X31215, Arkema) | Coagulated | Stable |
| Acrylic emulsion (NeoCar ® 820, Arkema) | Coagulated | Stable |
| Vinyl acrylic emulsion (Encor ® 6413, Arkema) | Coagulated | Stable |

The latex product comprising the polymeric adducts of the present disclosure also demonstrates the ability of shortening the coating setting-time when applied on a substrate. The results of testing associated with the time to a tack free and/or dry through coating is provided in Table 3. The latex product containing the polymeric adducts exhibits a substantial decrease in the "tack free" time and "dry through" time as compared to the latex product that does not contain a polymeric adduct.

TABLE 3

Setting times with and without the polymers or
polymeric adducts of the current invention.

| | TACK FREE/DRY THROUGH TIME | |
|---|---|---|
| Latex Description | Latex Product without Polymers or Polymeric Adducts | Latex Product with Polymers or Polymeric Adducts |
| Acrylic emulsion (Encor ® 626, Arkema) | >20 min/>20 min | 5 min/6 min |
| Acrylic emulsion (X31215, Arkema) | >20 min/>20 min | 5 min/8 min |
| Acrylic emulsion (NeoCar ® 820, Arkema) | >20 min/>20 min | 8 min/10 min |
| Vinyl acrylic emulsion (Encor ® 6413, Arkema) | >20 min/>20 min | 3 min/4 min |

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A latex comprising an anionically-stabilized latex and a polymer that is the product of at least one multifunctional amine compound reacted with one or more polyfunctional epoxy compounds;
   wherein the polyfunctional epoxy compounds comprise epoxides of unsaturated hydrocarbons and fatty acids/oils, epoxy ethers of multifunctional alcohols, or combinations thereof,
   wherein the epoxides of unsaturated hydrocarbons and fatty acids/oils are selected from the group of the epoxides of vinyl cyclohexene, dicyclopentadiene, cyclohexadiene, cyclododecadiene, cyclododecatriene, isoprene, 1,6-hexadiene, butadiene, polybutadiene, divinyl benzene, castor oil, soybean oil, and combinations thereof,
   wherein the epoxy ethers of multifunctional alcohols are selected from the group consisting of trimethyol propane triglycidyl ether, pentaerythritol tetraglycidyl ether, trimethyol ethane triglycidyl ether, ethylene glycol diglycidyl ether, sorbitol glycidyl ethers, 2-methyl-1,3-propane diol diglycidyl ether, neopentyl glycol diglycidyl ether, 2,2,4-trimethyl pentanediol diglycidyl ether, propylene glycol diglycidyl ether, hydrogenated bisphenol A diglycidyl ether, 1,4-butanediol diglycidyl ether, 1,6-hexanediol diglycidyl ether, and combinations thereof, wherein the amine compound and the one or more epoxy compounds provide 1.3 to 3.8 amine functional groups per epoxy functional group; and wherein the polymer is water soluble, has a number average molecular weight in the range of about 500 to about 1,000,000 Daltons, and comprises a nitrogen atom percentage of 5 to about 35%.

2. The latex of claim 1, wherein the at least one multifunctional amine compound is selected from the group consisting of ethylene diamine, butylene diamine, diethylene triamine, hexamethylene triamine, triethylene tetramine, polyoxyethylene amines, 2-methyl pentamethylene diamine, 1,3-diamino propane, 1,4-diamino butane, 1,5-diamino pentane, 1,6-diamino hexane, 1,2-diamino cyclohexane, isophorone diamine, tetraethylene pentamine, 4,4'-methylene-bis-cyclohexyl amine, bis(3-methyl-4aminocyclohexyl) methane, 2,2-bis(3-methyl-4-aminocyclohexyl) propane, 2,6-bis(aminomethyl) norborane, cyclohexane diamine, 3,4-diamino furan, phenylene diamine, 2,4-diamino toluene, polyalkylene oxide diamine, polyalkylene oxide triamine, 2,6 diamino toluene and the combinations thereof.

3. The latex of claim 1, wherein the at least one multifunctional amine compound is diethylene triamine (DETA) and the one or more polyfunctional epoxy compounds is ethylene glycol diglycidyl ether (EGDGE).

4. The latex of claim 1, wherein said polymer is an aqueous solution; and wherein, the aqueous solution has a pH value of about 8 to about 12 and a viscosity in the range of about 100 centipoise to about 100,000 centipoise when the solution comprises 70 wt. % of the polymer dissolved in water.

5. The aqueous solution according to claim 4, wherein the aqueous solution exhibits less than about a 30% viscosity change and maintains a transparent appearance when maintained at a temperature of 50° C. for 30 days.

6. The latex product according to claim 1 wherein the polymer has a number average molecular weight in the range of about 500 to about 500,000 Daltons, and comprises a nitrogen atom percentage of about 10 to about 30%.

* * * * *